US006731939B1

(12) United States Patent
Watanabe et al.

(10) Patent No.: US 6,731,939 B1
(45) Date of Patent: May 4, 2004

(54) APPARATUS, AND ASSOCIATED METHOD, FOR ALLOCATING CHANNELS IN A RADIO COMMUNICATION SYSTEM

(75) Inventors: Fujio Watanabe, Espoo (FI); Arto Palin, Lampäälä (FI); Takako Sanda, Yokohama (JP)

(73) Assignee: Nokia Corporation, Espoo (FI)

( * ) Notice: Subject to any disclaimer, the term of this patent is extended or adjusted under 35 U.S.C. 154(b) by 370 days.

(21) Appl. No.: 09/692,794

(22) Filed: Oct. 20, 2000

(51) Int. Cl.[7] .................................................. H04Q 7/28
(52) U.S. Cl. ..................................... 455/450; 455/452.2
(58) Field of Search ........................... 455/3.01, 41, 88, 455/550, 422, 575, 62, 450, 452, 452.1, 452.2, 432; 370/232, 231, 335

(56) References Cited

U.S. PATENT DOCUMENTS

| 5,579,306 A | * | 11/1996 | Dent ........................... 370/330 |
| 5,594,944 A | * | 1/1997 | Ogata et al. ................. 455/516 |
| 5,729,542 A | * | 3/1998 | Dupont ........................ 370/346 |
| 5,799,012 A | * | 8/1998 | Ayerst et al. ................ 370/336 |
| 5,978,875 A | * | 11/1999 | Asano et al. ................. 710/107 |
| 6,169,898 B1 | * | 1/2001 | Hsu et al. ................. 455/432.3 |
| 6,181,684 B1 | * | 1/2001 | Turcotte et al. ............. 370/332 |
| 6,246,881 B1 | * | 6/2001 | Parantainen et al. ........ 455/450 |
| 6,249,252 B1 | * | 6/2001 | Dupray ........................ 342/450 |
| 6,259,906 B1 | * | 7/2001 | Carlsson et al. ............. 455/403 |
| 6,301,479 B1 | * | 10/2001 | Roobol et al. ............... 455/436 |
| 6,493,550 B1 | * | 12/2002 | Raith ........................... 455/422 |
| 6,636,496 B1 | * | 10/2003 | Cho et al. ................... 370/335 |
| 2002/0045424 A1 | * | 4/2002 | Lee ............................... 455/41 |

OTHER PUBLICATIONS

Karol, M. J., et al.; "Time–Frequency–Code Slicing: Efficiently Allocating The Communications Spectrum To Multirate Users": XP000754819; IEEE Transactions on Vehicular Technology, vol. 46, No. 4; Nov. 1, 1997; pp. 818–826.
Harartsen, J.; "Bluetooth–the Universal Radio Interface for AD Hoc, Wireless Connectivity"—XP000783249; Ericsson Review, Ericsson, Stockholm, Sweden; No. 3, 1998; pp. 110–117.
Johansson, P., et al.; "Short Range Radio Based AD–HOC Networking: Performance and Properties"; XP000903607; ICC '99. 1999 IEEE International Conference on Communications. Conference Record Vancouver, CA, Jun. 6–10, 1999,IEEE International Conference on Communications, New York, NY: IEEE, US; vol. 3; pp. 1414–1420.

* cited by examiner

Primary Examiner—Nay Maung
Assistant Examiner—Tan Trinh

(57) ABSTRACT

Apparatus, and an associated method, for utilizing a Bluetooth-compatible access point and mobile stations of a WLAN (Wireless Local Area Network) system. A manner is provided by which to increase the number of mobile stations capable of communicating with an access point at any particular time during operation of the WLAN system. Limitations associated with a maximum of communication devices capable of forming a single piconet are obviated as additional piconets are defined, as required, to accommodate increased numbers of mobile stations to communicate with the access point of the WLAN system.

25 Claims, 13 Drawing Sheets

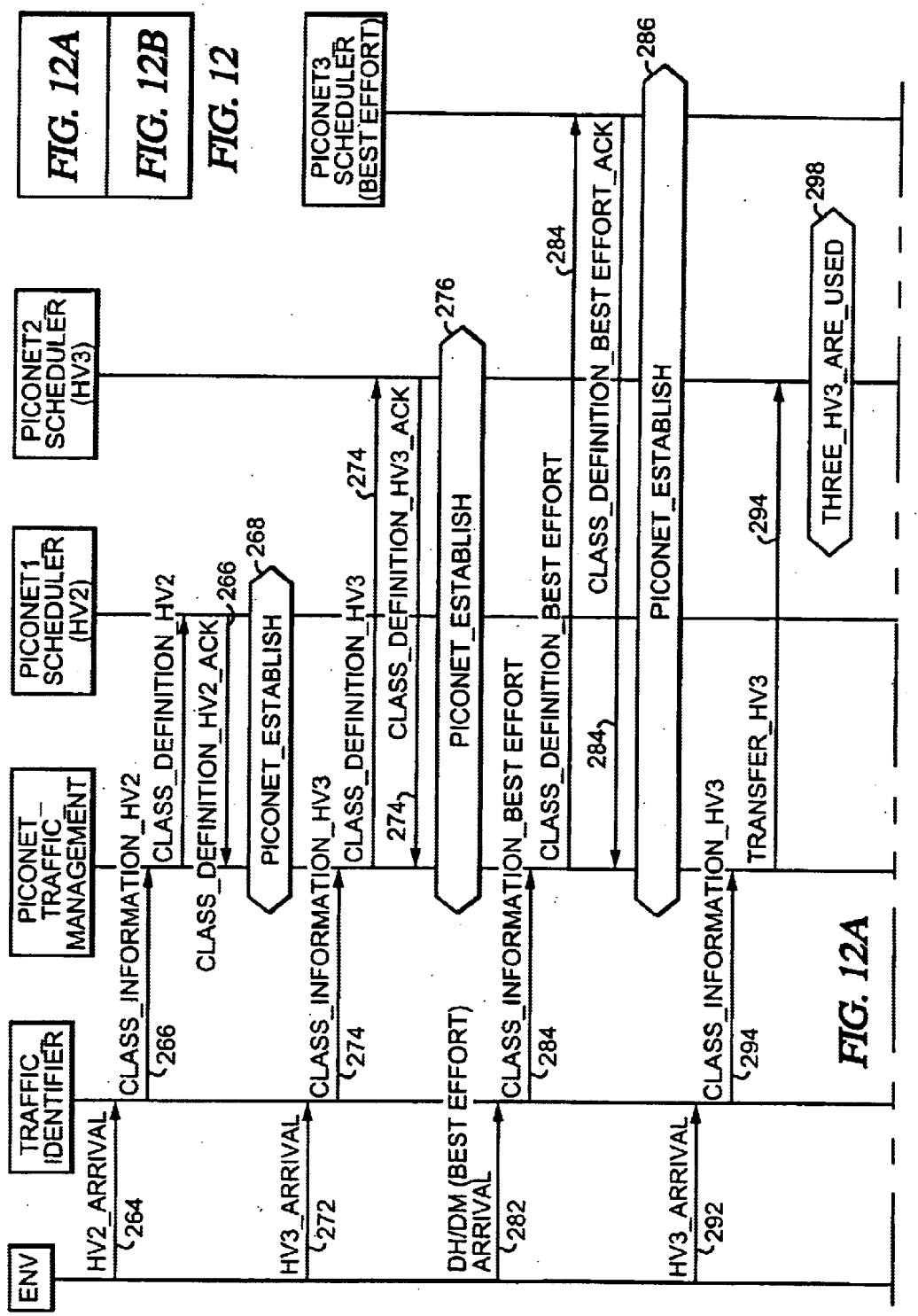

APPARATUS, AND ASSOCIATED METHOD, FOR ALLOCATING CHANNELS IN A RADIO COMMUNICATION SYSTEM

The present invention relates generally to a manner by which to assign channels for communications between mobile stations and a fixed site transceiver of a radio communication system, such as a WLAN (Wireless Local Area Network) system. More particularly, the present invention relates to apparatus, and associated method, by which to allocate channels in which the fixed-site transceiver and the mobile stations are operable pursuant to the Bluetooth, or other, standard. Greater numbers of mobile stations are permitted to communicate with the fixed-site transceiver than the limited number of mobile stations otherwise conventionally permitted to form a single piconet together with the fixed-site transceiver.

BACKGROUND OF THE INVENTION

New types of communication systems have been made possible as a result of advancements in communication technologies. Such new types of communication systems have generally permitted increased rates of data transmission or have provided more convenient manners by which to transmit data.

Advancements in communication technologies have, for instance, permitted the introduction, and popularization, of new types of radio communication systems. In a radio communication system, a communication channel formed between sending and receiving stations of the radio communication system are defined, at least in part, upon a portion of the electromagnetic spectrum. Because a wire line connection is not required to be formed between the sending and receiving stations, increased mobility is inherent in a radio communication system. That is to say, a communication station of a radio communication system is repositionable from one location to another while still permitting communications to be effectuated therethrough. And, communications are generally also possible as the communication station is moving. Mobile stations operable in a cellular communication system, for instance, permit communication therethrough as the mobile station is moving.

Various communication standards have been promulgated and communication devices operable in compliance with such standards have been developed. A so-called Bluetooth standard, for instance, has been promulgated in which operational requirements of a BLUEPAC (Bluetooth Public Access) communication system are set forth. Communication signals generated during operation of a BLUEPAC communication system are generally of low power levels transmitted at high-frequencies. The communication range of a Bluetooth device is relatively small, e.g., in the range of 10 m.

Proposals have been set forth to utilize Bluetooth technologies in WLAN (Wireless Local Area Network) systems. A WLAN system is operable in manners analogous to operation of a conventional, wired LAN (Local Area Network) system, but also utilize mobile stations connectable to the LAN by way of radio links.

Access points form portions of the network of a WLAN. An access point is a fixed-site transceiver capable of communicating with the mobile stations by way of radio links formed therebetween.

While access points defined in WLANs constructed pursuant to other communication standards, such as the HIPERLAN/2 (High Performance Local Area Network) permits a relatively large number of mobile stations to communicate with a single access point, an access point operable pursuant to the Bluetooth standard is not generally capable of communicating with any more than a small number, e.g., seven, mobile stations. In a HIPERLAN/2 system, MAC-ID and DLCC-ID values are utilized to identify communication stations. A MAC-ID is often an eight-bit length, and a DLCC-ID is of a six-bit length. Utilization of HIPERLAN/2 devices as access points are able to communicate with a number of mobile stations related to the bit-length of the identifier used to identify the mobile stations related to the bit-length of the identifier used to identify the mobile stations, either eight bits or six bits.

An identifier used to identify a Bluetooth device, in contrast, is of a bit length of only three bits. And, responsively, a Bluetooth-compatible device forming an access point is capable of communicating with only seven mobile stations in separate communications, i.e., communications which are other than a multi-cast communication.

This limitation limits the usefulness of Bluetooth-compatible devices to form access points in a WLAN as greater than seven mobile stations must be capable of operation with a single access point in a practical implementation of a WLAN system.

If a manner by which to increase the number of mobile stations which can communicate with a single Bluetooth-compatible access point could be provided, a Bluetooth-based WLAN system would be better able to be implemented.

It is in light of this background material related to radio communication systems that the significant improvements of the present invention have evolved.

SUMMARY OF THE INVENTION

The present invention, accordingly, advantageously provides apparatus, and an associated method, by which to assign channels for communications between mobile stations and a fixed-site transceiver of a radio communication system.

Through operation of an embodiment of the present invention, a large number of mobile stations are permitted to communicate with the fixed-site transceiver. When the fixed-site transceiver forms an access point of a WLAN (Wireless Local Area Network) system, existing limitations in the number of mobile stations capable of concurrently communicating with the access point are obviated if the access point is constructed pursuant to an embodiment of the present invention.

In one aspect of the present invention, a manner is provided by which to allocate channels in which the fixed-site transceiver and the mobile stations are operable pursuant to the Bluetooth, or other, standard. A Bluetooth-compatible access point formed of the fixed-site transceiver is capable of communicating with more than seven mobile stations. Seven is the maximum number of mobile stations, together with the access point, which can form a piconet, as defined in the Bluetooth standard. A plurality of piconets are formed, thereby to permit the additional numbers of mobile stations to communicate with the access point.

In another aspect of the present invention, Quality of Service (QoS) levels are associated with each of the mobile stations, at least pursuant to a selected communication service. Indications of the mobile stations together with the QoS levels associated therewith form a database stored at a storage device accessible by the access point. Piconets are defined to include mobile stations having common QoS levels associated therewith. That is to say, the mobile stations positioned within the coverage area encompassed by the access point are segregated according to the QoS levels associated therewith. In other words, one piconet is mapped into one QoS level. Mobile stations operable at QoS levels of different values are assigned to different piconets.

In another aspect of the present invention, mixed traffic per piconet is utilized. A piconet to which mobile stations exhibiting a selected QoS level are also permitting of mobile stations operable pursuant to a lesser QoS level. Communication services are effectuated with mobile stations which require the higher QoS level prior to permitting communications with mobile stations which have associated therewith the lower QoS levels. By permitting mixed traffic per piconet, greater channel efficiencies are achievable.

In another aspect of the present invention, a hopping pattern is provided for communications with mobile stations assigned to different ones of the piconets. Mobile stations assigned to a piconet have clocks which are synchronized to the clock of a master defined in each of the piconets. The clocks of all of the mobile stations in the piconets are adjusted to correspond to the clock of a master assigned to the piconet, but offset by a selected amount. Different ones of the piconets are offset by different timing periods so that different clock timing is exhibited in the different piconets.

In one implementation, the access point and mobile stations are operable pursuant to the Bluetooth standard which provides for short range, radio communications between communication stations, such as between the mobile stations and the access point. Piconets are defined pursuant to the Bluetooth standard in which one master device and up to seven slave devices are permitted to form a piconet. Each of the mobile stations has associated therewith a QoS level at which communications pursuant to a least one communication service are to be effectuated. In other words, one piconet is mapped into one QoS level. As any communication station, formed either of an access point or a mobile station, can form a master device for a piconet, a large number of piconets, and correspondingly large numbers of mobile stations, can be associated with a single access point to permit communications therewith. Thereby, a manner is provided by which to permit increased numbers of mobile stations to communicate with a Bluetooth-compatible access point in a WLAN system.

In these and other aspects, therefore, apparatus, and an associated method, is provided for a radio communication system in which a plurality of mobile stations communicate by way of radio links with a fixed-site transceiver. A scheduler allocates communication channels upon which to permit communications between the fixed-site transceiver and selected ones of the plurality of mobile stations. A storage device is coupled to the fixed-site transceiver. The storage device stores indications of identities of the plurality of mobile stations together with quality levels at which selected communications therewith are to be effectuated. An assignor is coupled to the storage device and is capable of retrieving the indications stored thereat. The assignor is selectably operable to define at least a first set of mobile stations of the plurality of mobile stations. The first set of mobile stations has a maximum number, or fewer, of mobile stations. The assignor assigns a communication channel upon which communications between the mobile stations of at least the first set and the fixed-site transceiver are to be effectuated.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION OF THE PREFERRED EMBODIMENT

Figure 1:
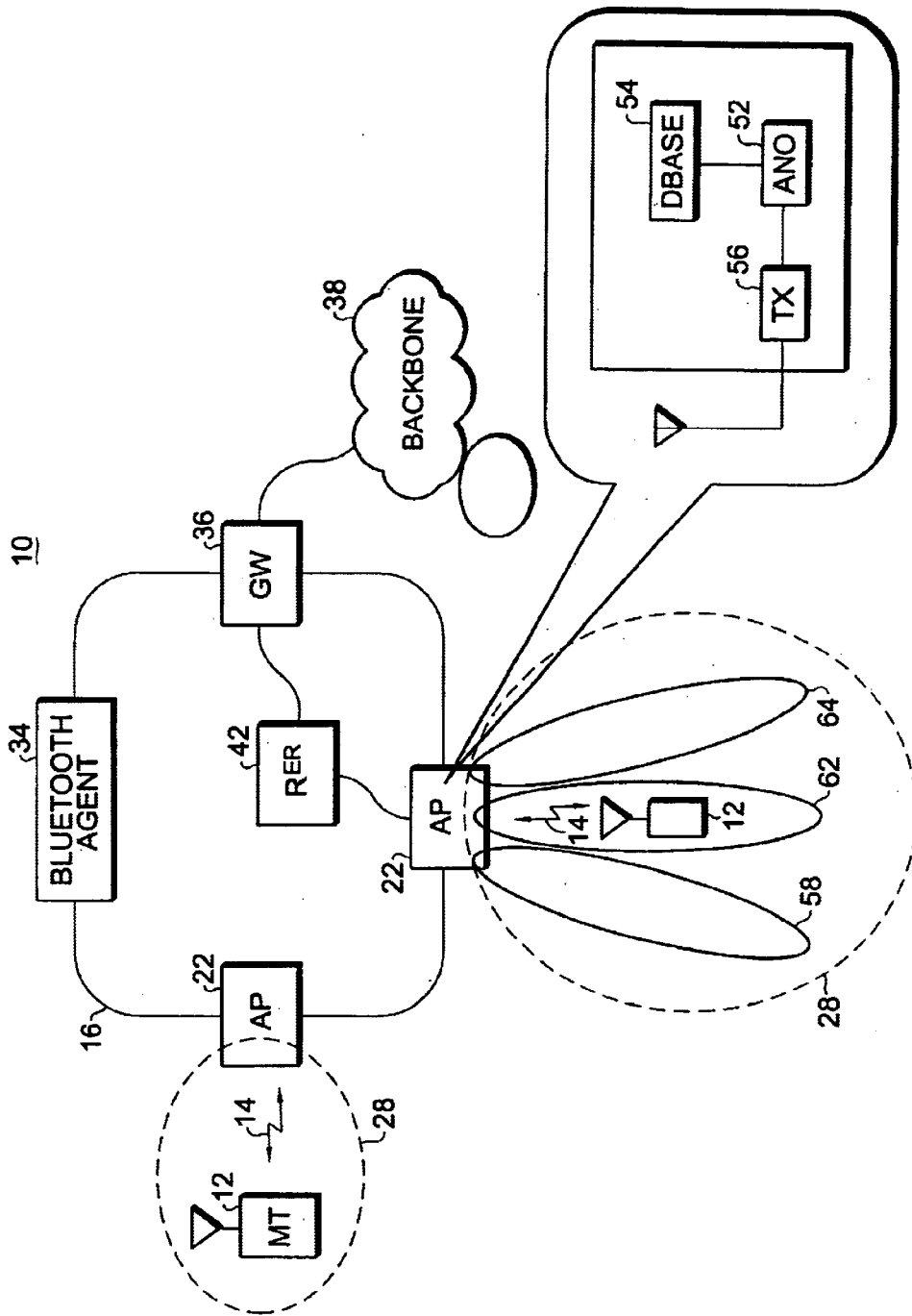
FIG. 1 illustrates a functional block diagram of a communication system in which an embodiment of the present invention is operable.

Referring first to FIG. 1, a communication system, shown generally at 10, provides for radio communications with a plurality of mobile stations 12 by way of radio links 14. In the exemplary implementation, the communication system forms a BLUEPAC (Bluetooth Public Access) communication system forming a WLAN (Wireless Local Area Network) system. In other implementations, other embodiments of the present invention are similarly implementable in other such radio communication systems.

Here, the communication system includes a LAN (Local Area Network) portion 16 formed of a plurality of elements networked together. Only a single network loop is illustrated in the Figure to form the LAN. In an actual implementation, the LAN may be comprised of more than one interconnected, heterogeneous LAN.

Included amongst the elements of the LAN 16 are a plurality of Bluetooth-compatible access points 22. Each of the access points 22 defines a coverage area 28 within which Bluetooth communications with mobile stations positioned therein are effectuable.

The LAN 16 is also shown to include a BLUEPAC agent 34 to which a mobile station 12 can be networked together by way of a radio link 14 and the fixed structure of the LAN. Also, the LAN is shown to include a gateway 36 which forms a gateway to a public (or other) backbone 38, such as a PSTN (Public-Switched Telephonic Network) or internet backbone. Communications are thereby effectuable between a communication station (not shown) connected to the backbone 38 with a mobile station, by way of the LAN 16 and a radio link. The LAN further includes a router 42, effectuable in conventional manner, to route data through the LAN to permit communication of the data with the mobile station.

An embodiment of the present invention is operable to facilitate greater numbers of mobile stations to communicate with a single access point when positioned within a coverage area encompassed by the access point. By increasing the number of mobile stations capable of communicating with a single access point, increased communication capacity is permitted within the WLAN system.

The access point 22, according to an embodiment of the present invention, includes an assignor 52 which is coupled to a database 54 formed at a storage device. The access point is further shown to include, in conventional manner, a transceiver 56 operable to transceive communication signals by way of radio links with mobile stations, such as the mobile station 12. During operation of an embodiment of the present invention, indications of identities of the mobile stations positioned in the coverage area 28 encompassed by the access point 22. Indexed together with the indications of the identities of the mobile stations 12 are QoS (Quality of Service) levels at which communication services with the corresponding mobile station, at least pursuant to a selected communication service, are to be effectuated. The information stored at the database 54 is accessible by the assignor 52.

The assignor is operable to allocate communication channels upon which to effectuate communications with selected ones of the mobile stations. The Bluetooth standard, pursuant to which the mobile stations and the access point are operable, define piconets of communication devices which share a common communication channel. A piconet can be formed of up to seven slave devices and a master device. A single communication device, such as a mobile station or the access point, however, can become members of more than one piconet, that is, can be a master device at one piconet and simultaneously a slave device at another piconet.

By taking advantage of this property of a piconet defined in the Bluetooth system, a plurality, if necessary, of piconets are defined in a single coverage area 28 encompassed by the access point 18. Here, three piconets—a first piconet 58, a second piconet 62, and a third piconet 64—are dynamically defined within the coverage area 28. In the exemplary implementation of operation of the assignor 52, piconets are defined according to the QoS level pursuant to which communications with mobile stations are to be effectuated. And, the assignor assigns mobile stations to form selected piconets depending upon the QoS level associated with the communications to be effectuated with such mobile stations.

Here, mobile stations operable pursuant to high quality voice service are assigned to the first piconet 58. And, mobile stations with which communications are to be effectuated at lower QoS levels are assigned to the second and third piconets 62 and 64. Here, in the piconets 62 and 64, only best-effort QoS levels are associated with the second and third piconets 62 and 64.

As traffic conditions change, i.e., as communication sessions to effectuate communication services with individual ones of the mobile stations and others commence, the piconets are redefined, as appropriate, to allocate communication channels upon which to permit communications to be effectuated.

In the exemplary implementation, each communication device, the mobile stations and the access point, are defined by an IEEE address which is of a 48-bit length. A frequency hopping pattern by which communications are defined and, more particularly, the timing of communications, is dependent upon the address.

Figure 2:
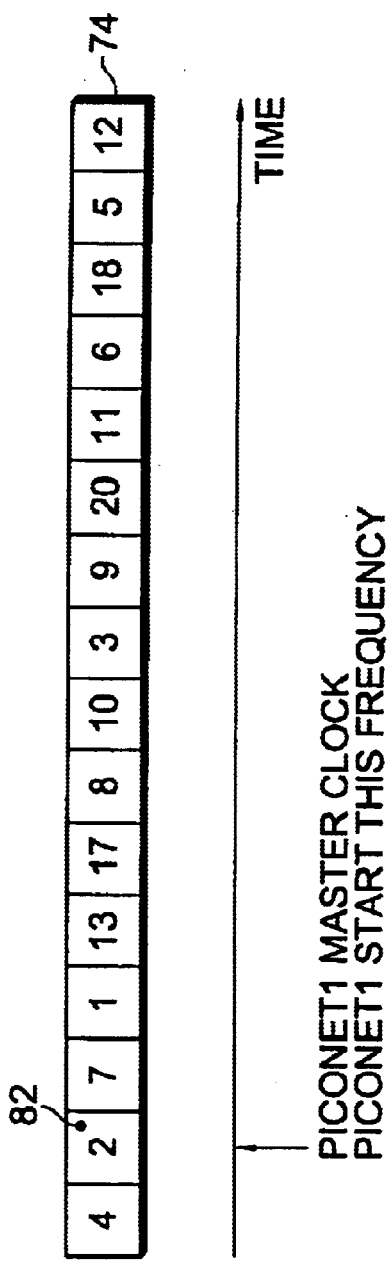
FIG. 2 illustrates a representation of a timing scheme utilized in one implementation of an embodiment of the present invention by which to reduce the likelihood of interference generated responsive to concurrent communications in different piconets of the communication system shown in FIG. 1.
Figure 2:
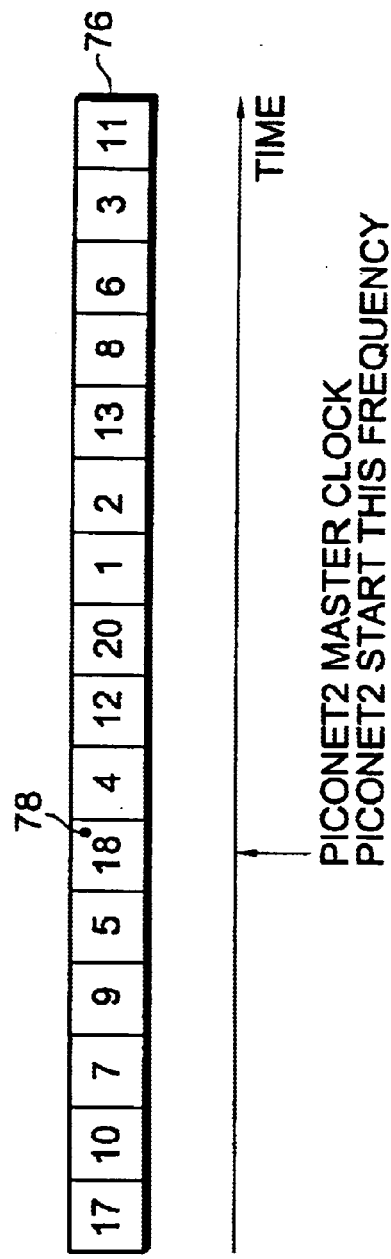

FIG. 2 illustrates the frequency hopping pattern sequence, shown generally at 72, defined pursuant to an embodiment of the present invention. Here, the first sequence 74 is defined by an exemplary IEEE address used to define the access point 22. Because the frequency hopping pattern is cyclic, a master clock associated with each piconet, here, the piconets 58, 62, and 64, determine an exact start frequency, which forms a sequence of the frequency hopping pattern. As set forth in the Bluetooth standard, each piconet has its own master device, then different master devices have different native clocks, thereby to reduce the possibility of a hopping collision. As shown in FIG. 2, the hopping pattern 74 associated with a first piconet is 2, 7, 1, 13, 17 . . . . And, the sequence 76 associated with a second piconet is 18, 4, 12, 20 . . . . The starting points 78 and 82 associated with the respective sequences 74 and 76 are determined by the master clock associated with the respective piconets.

When a piconet is established, the clocks associated with the communication devices of the piconet are synchronized. To synchronize a hopping sequence, the clock timing difference between the clocks of master and slave devices are adjusted.

Figure 3:
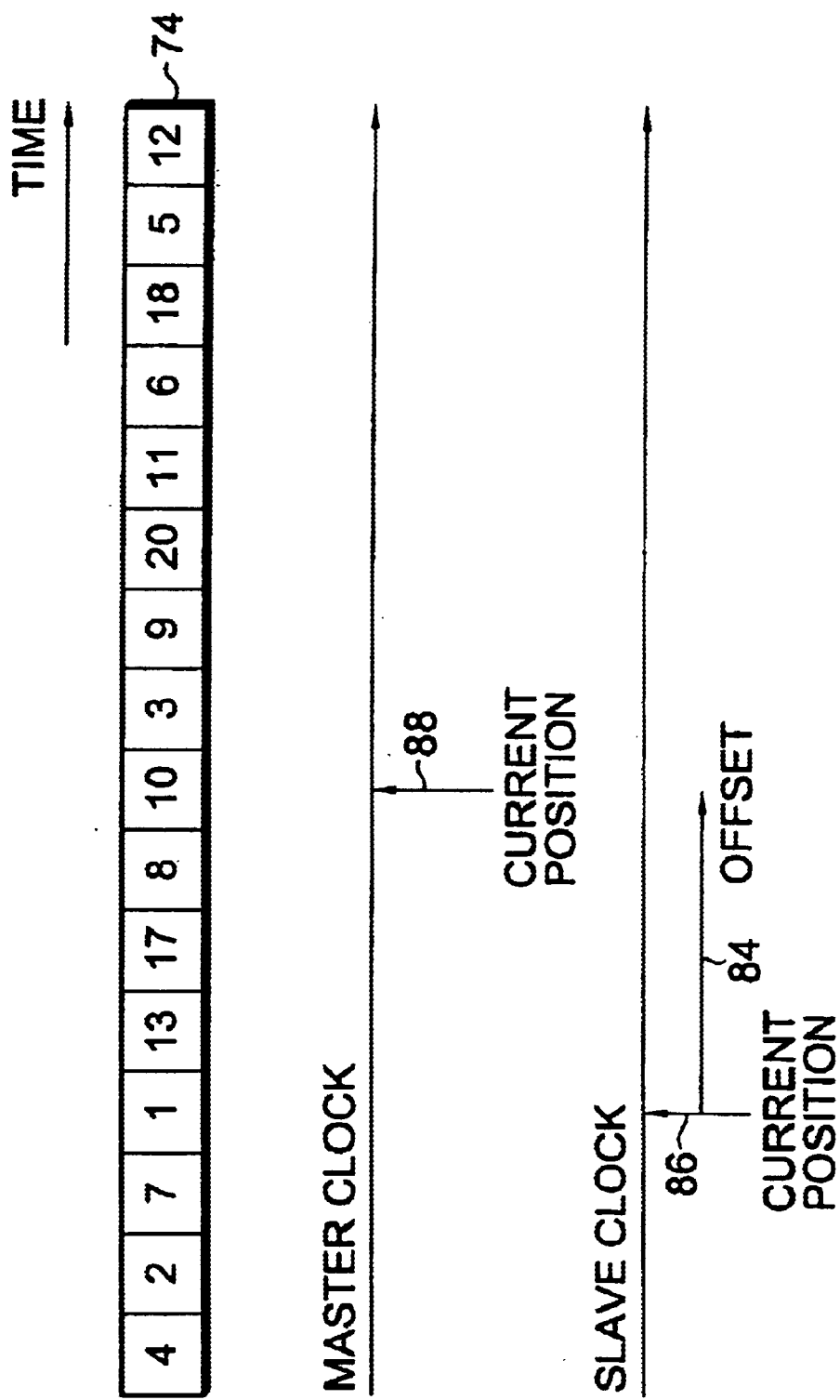
FIG. 3 illustrates another representation of a timing scheme, here representing the relative time offsets defined during operation of an embodiment of the present invention.

FIG. 3 again illustrates the sequence 74 forming the hopping pattern associated with a first piconet. The offset between a master clock of a master device of the piconet and a slave clock of a slave device of the piconet is indicated by an offset 84 by which recurrent position 86 of a slave clock of a slave device is offset from the current position 88 of the master clock of a master device.

Figure 4:
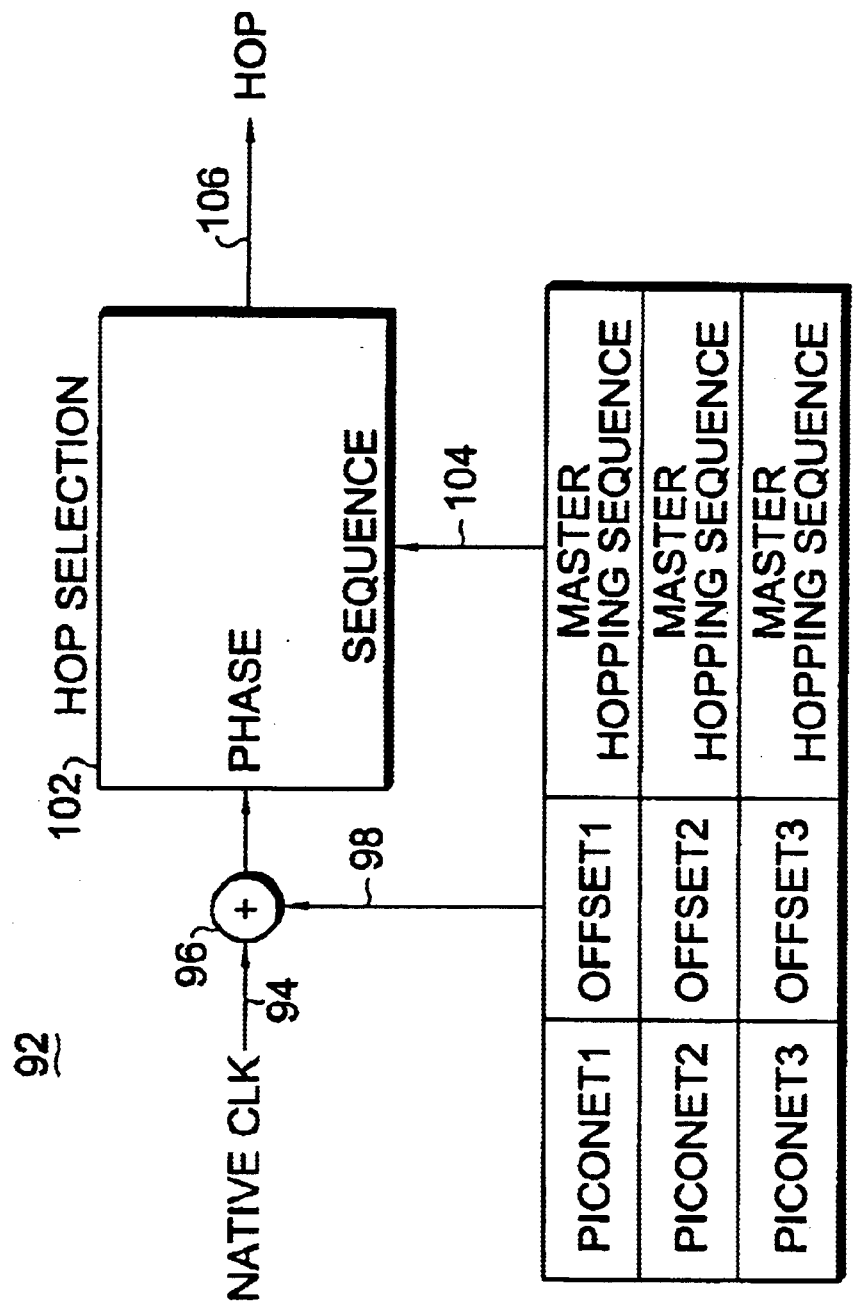
FIG. 4 illustrates a functional block diagram of the manner by which the hop-selection is selected during operation of an embodiment of the present invention.

FIG. 4 illustrates functional structure, shown generally at 92, of a manner by which hopping sequences are generated. In the illustration of the figure, a single device belongs to three piconets—piconet 1, piconet 2, and piconet 3. Here, a native clock input is generated on the line 94 and provided to an input of a summer 96. Offsets of the various piconets are provided to a second input of the summing device, here by way of the line 98. Summations formed by the summer 96 are provided to a phase input of a hop selector 102. And indications of the hopping sequence of the respective piconets are provided to a sequence input of the hop selector 102, here by way of the lines 104. A hopping selection is generated on the line 106 therefrom. The access point 22 forming the master device has one master IEEE address and one master clock associated therewith. This means that the frequency hopping pattern is the same. This is for the reasons that the hopping pattern is generated by one master IEEE address and the phase is determined by one master clock in the access point. Clock offsets by slave devices adjust their clock to the master device so that all slave devices in each piconet adjust their respective clocks to the master clocks. This results in all devices in a piconet including the access point shall have the same clock timing resulting in increased susceptibility of collision.

A reduced susceptibility of collision is facilitated by adding an additional offset to the clock offsets by which the different piconets are offset from the master clock. Thereby, the same clock timing is avoided when the access point (the master) has many piconets.

Figure 5:
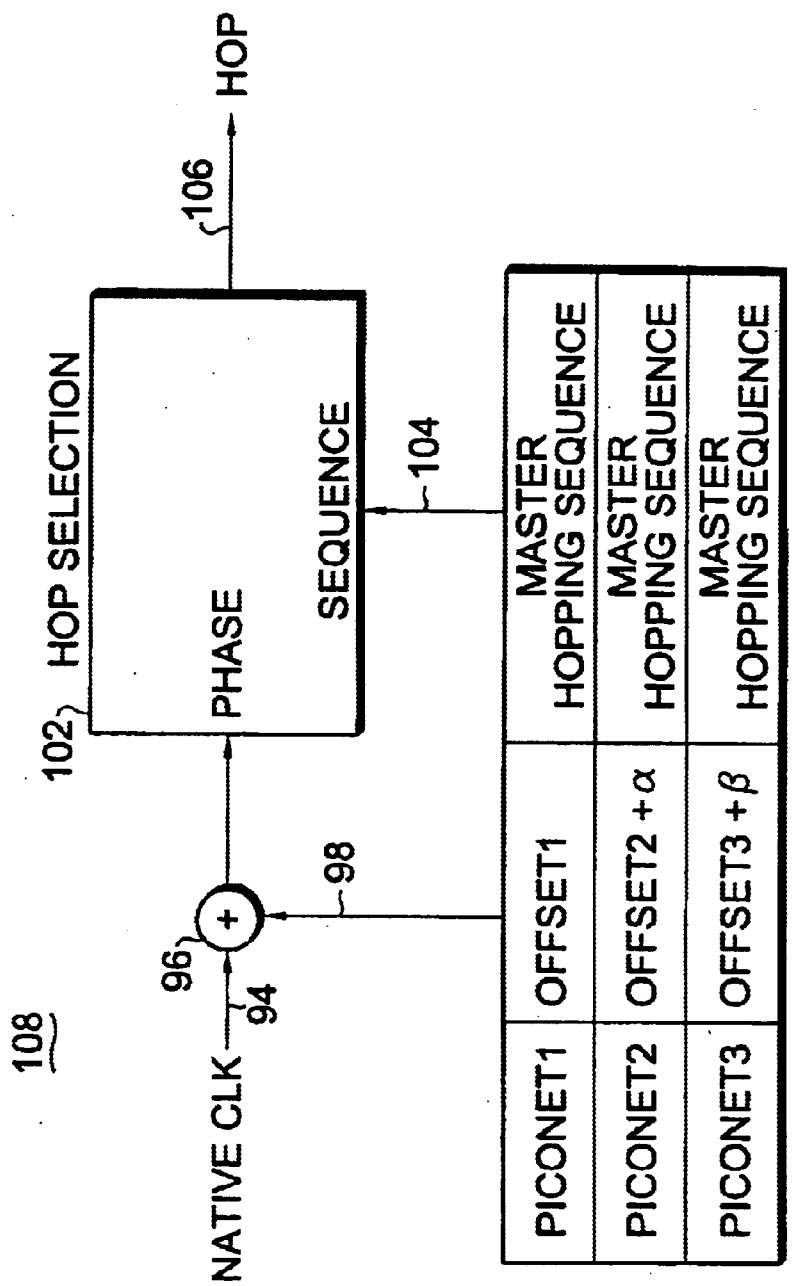
FIG. 5 illustrates another functional block diagram, similar to that shown in FIG. 4, but here showing a manner by which the hop-selection is made by offsetting both the master clock of a master device and the clock of a slave device in a piconet.

FIG. 5 illustrates the functional structure, here shown generally at 108, of a manner by which to form a hopping selection which reduces the susceptibility of collision of concurrently-generated communications in different piconets. Structure 108 is operable in manners generally corresponding to that described with respect to the structure 92 shown in FIG. 4. Here, though, the additional clock offset is added to the master clocks of the second and third piconets.

Figure 6:
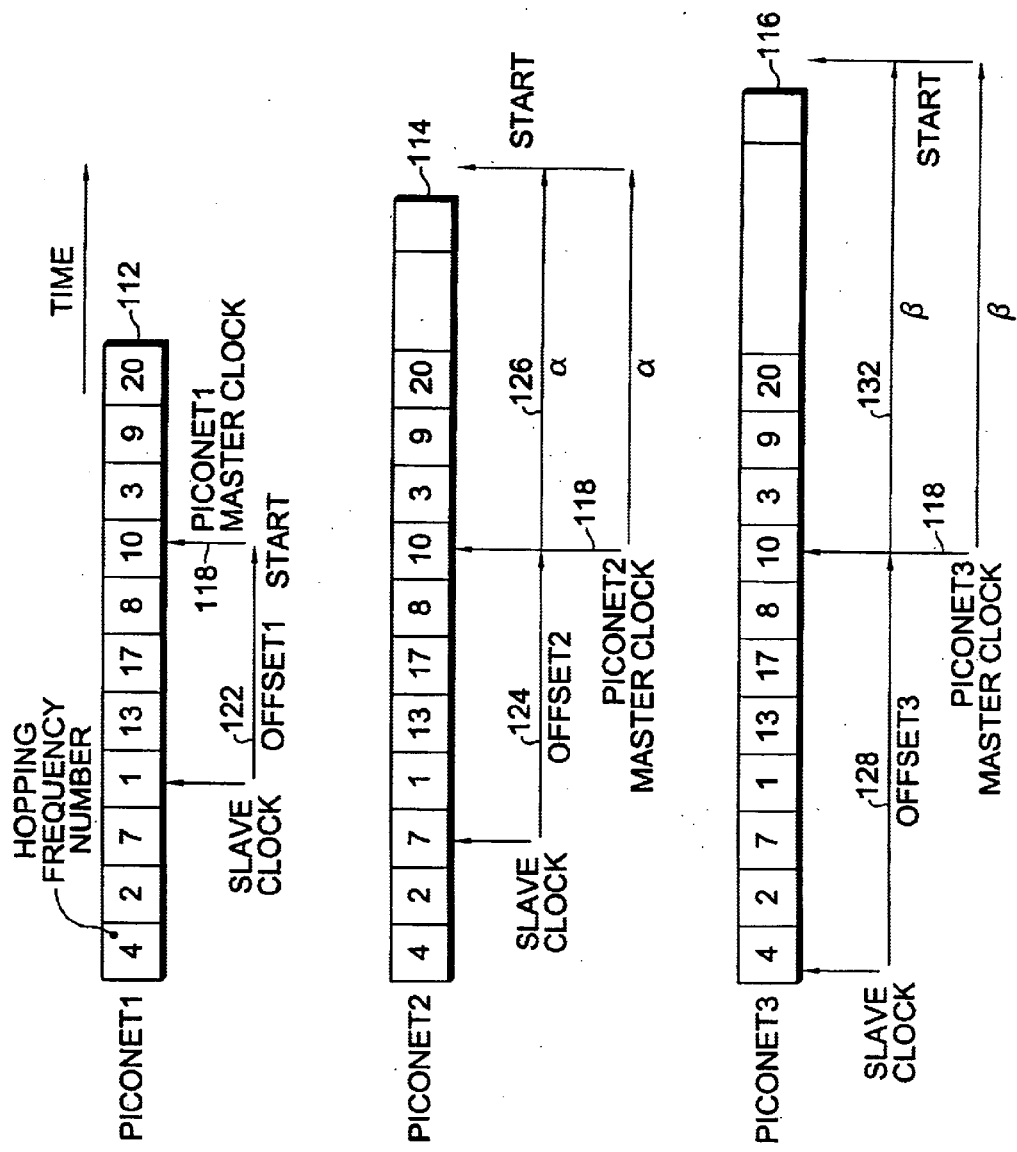
FIG. 6 illustrates another representation of a timing scheme utilized during operation of another embodiment of the present invention.

FIG. 6 illustrates the sequences of the hopping selections made pursuant to the structure 108 according to an embodiment of the present invention. Here, the same sequences 112, 114, and 116 are associated with each of the three piconets. The start times of the master clocks, indicated by the arrows 118, are the same for each of the piconets. The clocks of the slave devices of the first piconet are offset by a first clock offset 122, while the clock offsets of the slave devices of the second piconet are offset by a second clock offset 124 along with a variable 126, indicated by alpha. And, the clocks of the slave devices of the third piconet are offset from the master clock 118 by a third offset 128 with an additional offset, beta, 132.

In the first piconet, the master clock is not offset because one of the piconets is able to use the original master clock value. In the second piconet, the additional offset 126 is selected to be an amount greater than 16. As to the third piconet, the variable offset 132 is greater than thirty-two.

Figure 7:
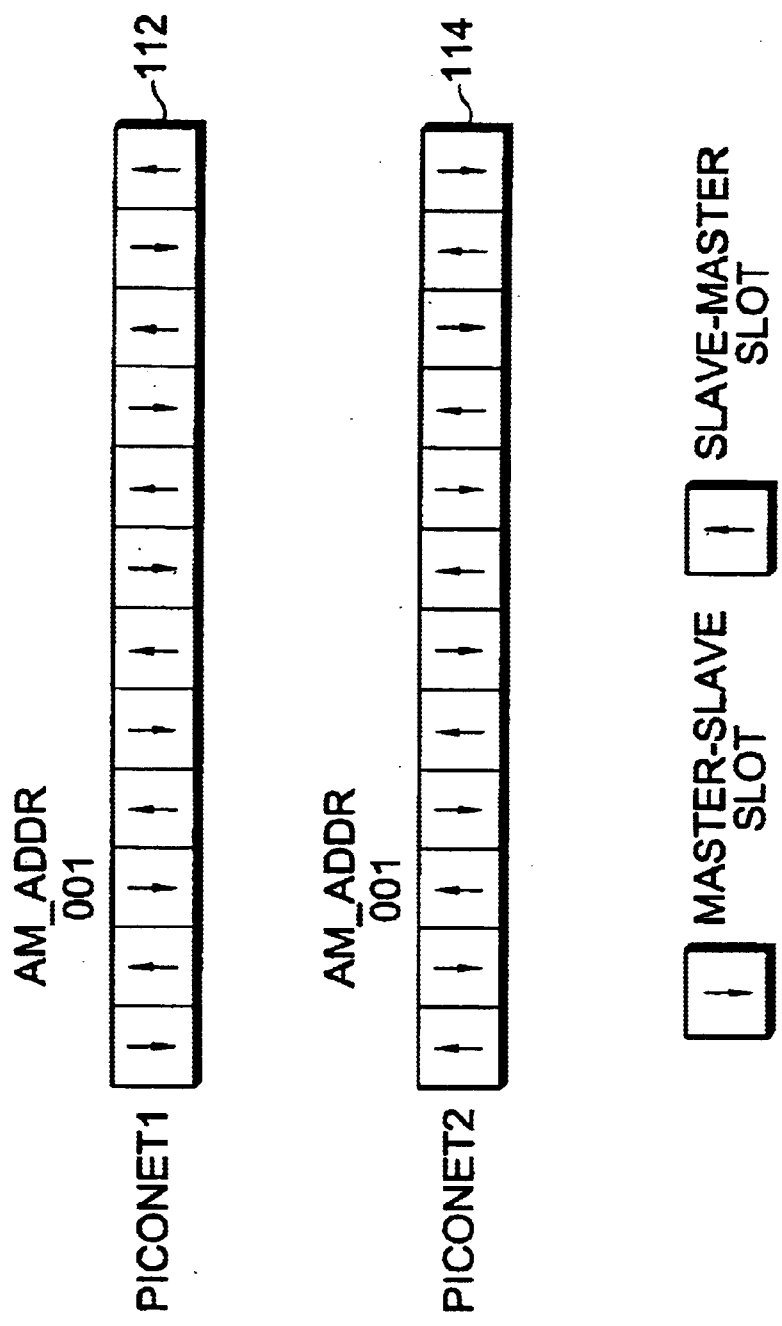
FIG. 7 illustrates a representation of the directions in which data is communicated in a representative pair of piconets shown in FIG. 6.

FIG. 7 illustrates the transmission direction, i.e., a forward-link direction of communications by the access points to a mobile station or a reverse-link direction of communications by a mobile station to the access point during time slots defined in the piconets, here the first and second piconets 112 and 114. The clock has twenty-eight bits, referred to as CLK (0-27). A forward link direction of communications by the access points to a mobile station starts at even-numbered slots when the first two bits (CLK (0-1)) of the master clock are of a value of '00'. In addition to the master clock offset 126 and 132 in terms of hopping frequency, additional clock offset '00' (master-to-slave transmission) and 10 slave-to-master transmission in its bits are used to change the transmission directions. Consequently, the transmission directions in the corresponding time slots of the separate piconets extend in opposing transmission directions. Because of the odd and even offsets of the segments 126 and 132, shown in FIG. 6, the transmission directions in the corresponding time slots of the separate piconets extend in opposing transmission directions. As an active member address of a three-bit length, transmission by the access point in the first piconet of data to an active member address 001 might occur. At the same time, a slave device, also of address 001, in the second piconet detects the communication generated in the first piconet. If the listening frequency of the first piconet happens to be the same as that of the piconet, the slave device in the second piconet detects the communication generated in the first piconet. It is, therefore, preferable that the start frequency of the second piconet differs with the start frequency in the first piconet and, also, that the transmission direction in the slot is in opposition, as shown in FIG. 7.

If more than two piconets are located within the coverage area of a single access point, and as shown in the exemplary implementation of FIG. 1, the frequency segments are preferably chosen so as not to be overlapped. For example, the hopping frequency used at a first piconet and a hopping frequency utilized at a third piconet are not overlapped. However, the hopping frequency of the second piconet is overlapped.

A manner is preferably provided by which to inform the master clock of the offset value, i.e., the values of the segments 126 and 132, of slave devices. Communications between the master and slave devices of the piconets defined in the Bluetooth standard are communicated utilizing the packet structure shown in FIG. 8. Generally, the packet structure is formed of a packet header 134, an access code 136, and a payload 138. The access code is shown further to be divided into a preamble portion 142, a sync word 144, and a trailer 146. The payload is shown to be further divided into a parity bit portion 148, a LAP portion 152, an undefined portion 154, a SR bit portion 156, a SP bit portion 158, a UAP bit portion 162, a NAP bit portion 164, a class of device identifier 166, an AM_ADDR portion 168, a CLK 27-2 portion 172, a page scan mode identifier 174, and, selectively, error correction bits 176. The packet header 134 is shown to be formed an AM_ADDR portion 178, a type portion 182, a flow portion 184, an ARQN portion 186, a SEQN portion 188, a HEC portion 192, and, selectively, an error correction portion 194.

When a new piconet is formed through operation of the assignor 52 (shown in FIG. 1), so that more than two piconets are defined within the coverage area encompassed by the access point with which the assignor is associated, the CLK portion 158 of the payload is updated with the master clock offset. When a mobile station forming a slave device detects the values of the CLK portion, the slave device is able to adjust, i.e., offset, its clock in response.

For instance, a slave device, mobile station, forming a member of the first piconet is operable to effectuate a high quality voice service which requires use of all the slave-to-master slots of the communication channel allocated to the first piconet. In this example, the master device, the access point, starts its transmission in even-numbered time slots, and the mobile station forming a slave device starts its transmission in odd-numbered time slots.

Figure 9:
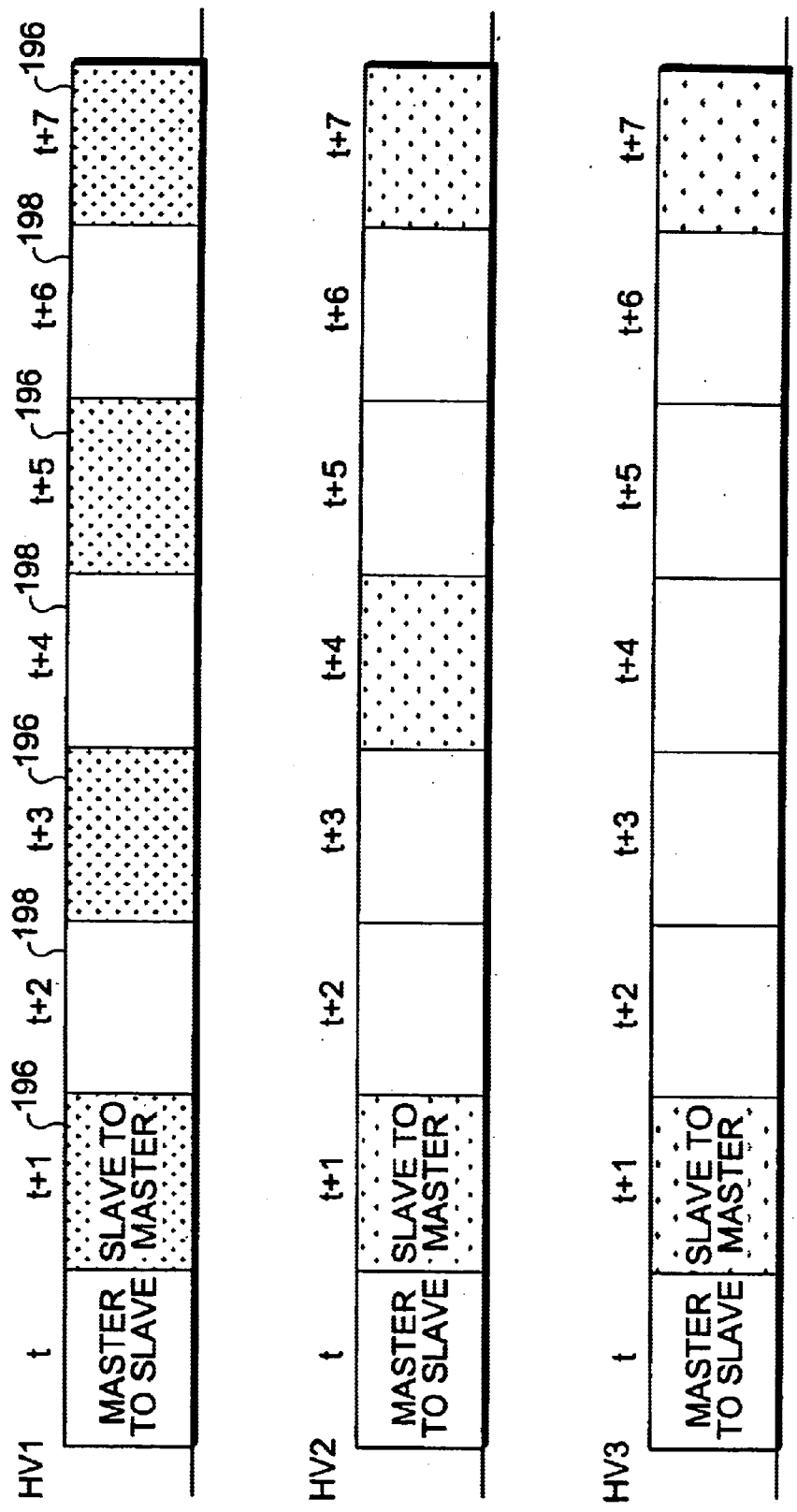
FIG. 9 illustrates a representation of a timing scheme created pursuant to operation of another embodiment of the present invention.

FIG. 9 illustrates graphically the exemplary scenario. The odd-numbered slots 196 are utilized by the mobile station forming the slave device and the even-numbered slots 198 are utilized by the access point forming the master device. In this scenario, other active devices do not have an opportunity to communicate as all the available time slots are utilized by one of the mobile stations. Communication termination, or delay, results. In this scenario, other mobile stations having the same QoS levels associated therewith cannot satisfy the QoS requirements. Additionally, other asynchronous connectionless devices encounter delay problems.

Different mobile stations, and communications to be effectuated thereby, are categorizable into a couple of QoS levels, such as voice, video, and data. Each piconet, according to an embodiment of the present invention, is defined according to a QoS level. As illustrated back in FIG. 1, different piconets are associated with different QoS levels. The first piconet supports only high quality voice data in which voice data pursuant to a communication session is transmitted every sixth time slot. This frequency of transmission is indicated in the bottom-most (as shown) sequence of FIG. 8 and the time slots 196 thereof. A second piconet supports, for instance, another high quality voice level in which voice information is communicated pursuant to a communication session every fourth time slot, indicated by the middle sequence shown in FIG. 9. Two mobile station communication sessions are operable in the second piconet.

Figure 8:
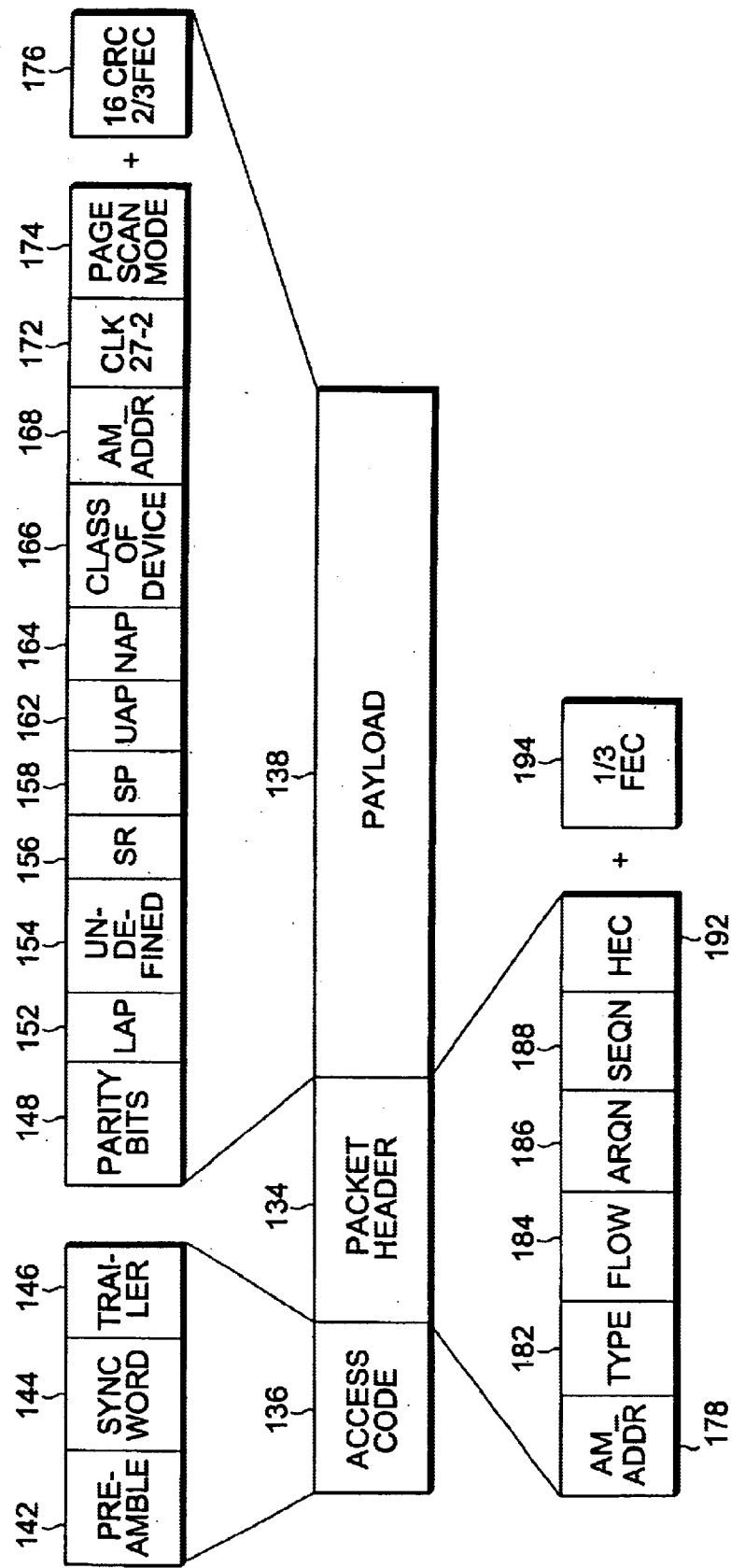
FIG. 8 illustrates a FHS packet structure utilized during operation of an embodiment of the present invention.

The maximum number of active mobile stations per piconet is lip to seven, based upon the three-bit length of the AM_ADDR address. Standby mode devices are able to form portions of a piconet for so long as an AM_ADDR address is available. In the exemplary implementation in which a single traffic QoS level is utilized per piconet, only a simple mapping between piconets and QoS levels is required. When the QoS level, a traffic identifier, is identified, a mapping between the traffic class and the piconet is effectuated. In order to separate communications into each piconet, the type portion 182 of the header 134 defined in the packet structure shown in FIG. 8 is used to identify the QoS information. Voice and non-voice data can be identified, thereby.

Another parameter can use the field of class device in the FHS packet shown in FIG. 8. A FHS packet is used for the frequency hop synchronization before the piconet channel has been established, or when an existing piconet changes to a new piconet. Therefore, the function of the traffic identifier is to check the class of device which is a part of the payload header of the FHS packet at the beginning of a connection establishment.

Figure 10:
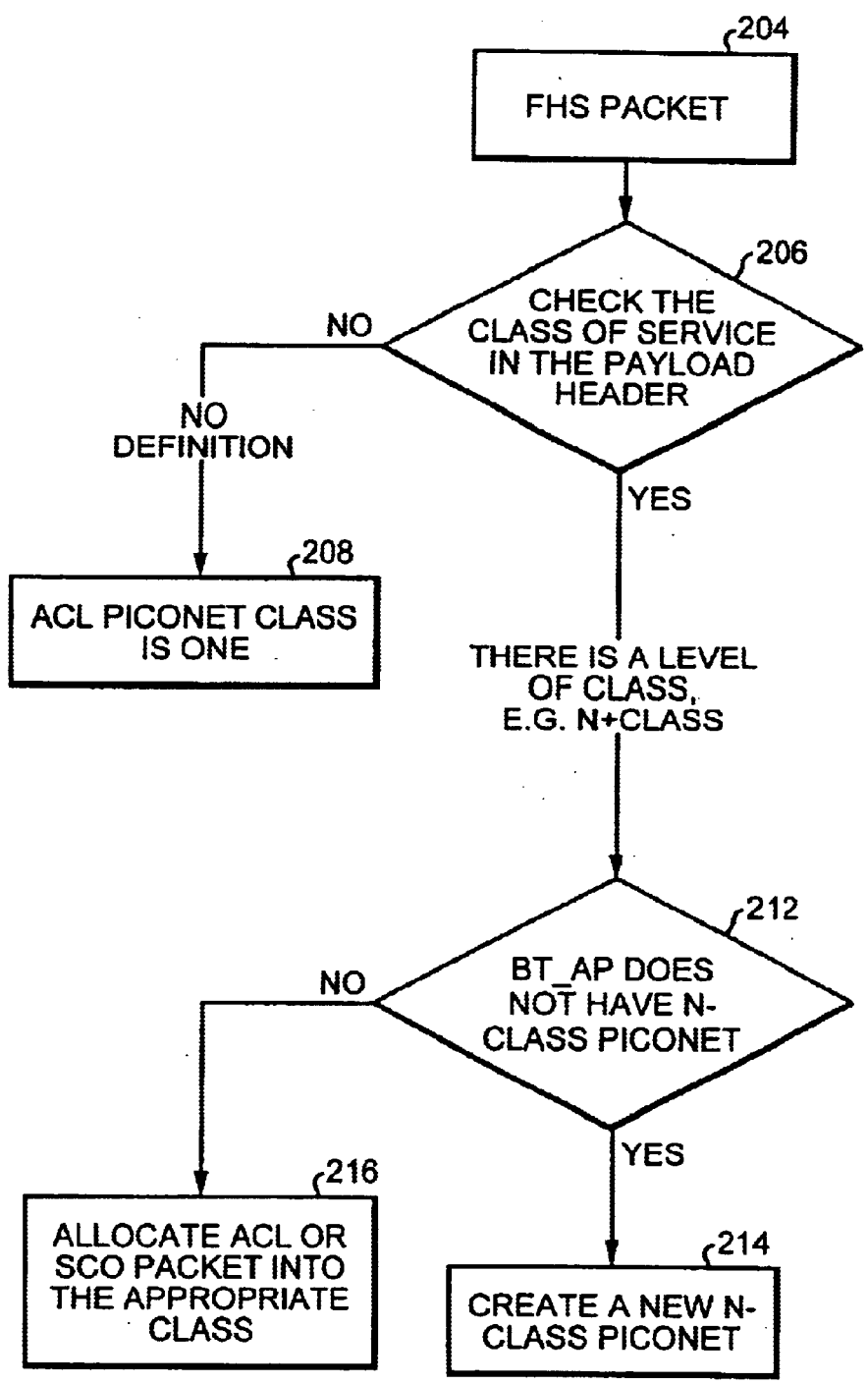
FIG. 10 illustrates a method flow diagram listing the method of operation of an embodiment of the present invention.

FIG. 10 illustrates a method, shown generally at 202, which describes the manner by which the class of device which is part of the payload header of the FHS packet is checked. The FHS packet is indicated by the block 204. First, and as indicated by the decision block 206, a determination is made of the class of device in the payload header. If there is no definition, the no branch is taken to the block 208 and the ACL (Asynchronous Connectionless) piconet class is considered to be of a value of one. If, conversely, there is a level of class in the payload header, the yes branch is taken to the decision block 212. At the decision block 212, a determination is made as to whether the access point is a n-class piconet. If it is not, a branch is taken to the block 214 and a new n-class piconet is created. Otherwise, allocation is made of an ACL or SCO packet into the appropriate class, indicated by the block 216.

After a connection is established between an access point and a mobile station, the traffic identifier is to check the type portion 182 of the packet header and the class of device portion 166 of the payload header. If only a single piconet is utilized in the coverage area, the portion 182 is only used for the scheduling purposes. However, otherwise, the portion 182 is used also for traffic sharing in order to satisfy QoS levels.

Figure 11:
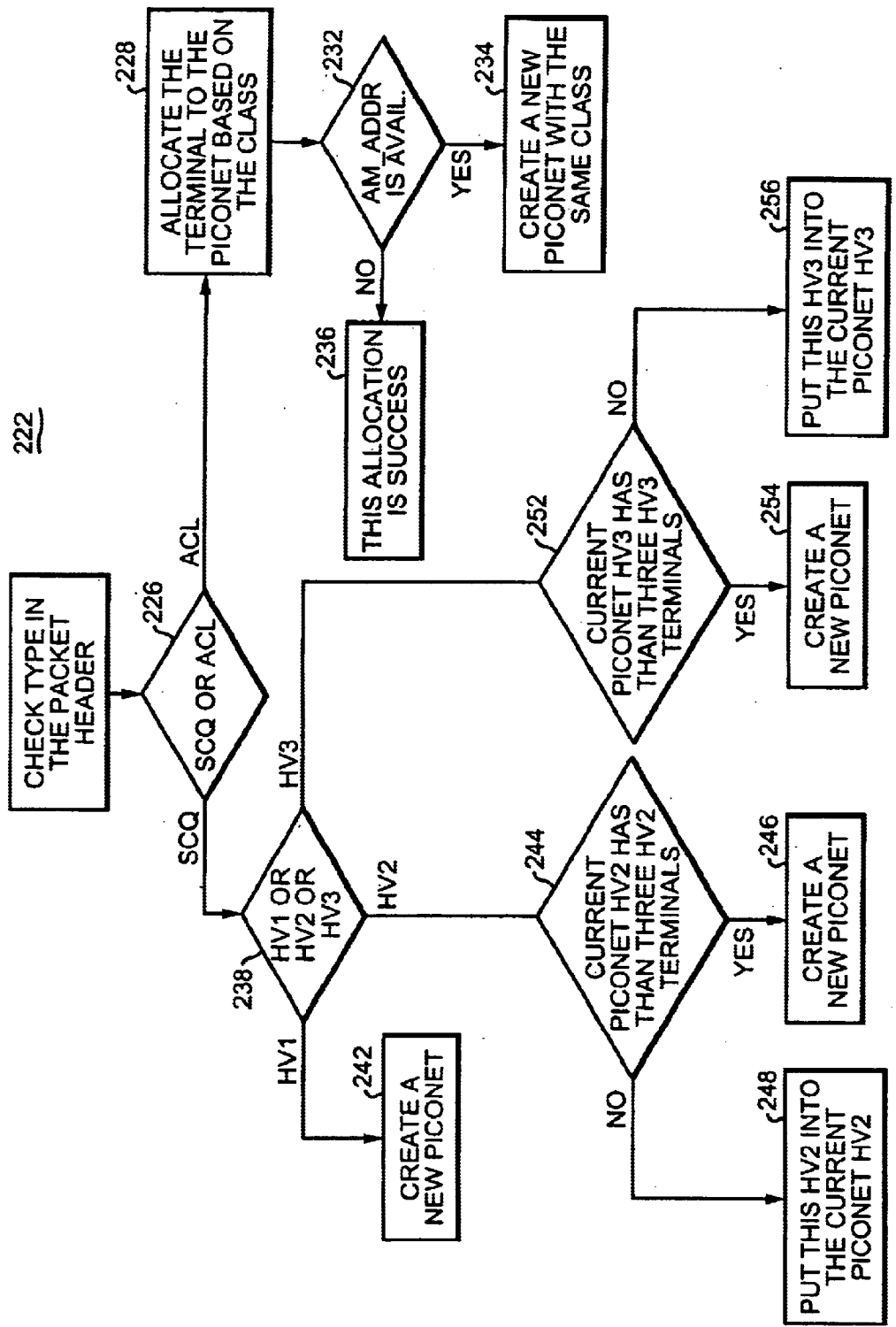
FIG. 11 illustrates another method flow diagram, also representative of operation of an embodiment of the present invention.

FIG. 11 illustrates a method, shown generally at 222, of an embodiment of the present invention by which to check the portion 182 of the packet header. First, and as indicated by the decision block 226, a determination is made whether the data is a SCO-type or ACL-type. If the packet is an ACL-type, a branch is taken to the block 228 whereat a mobile station which sends the data is allocated to the piconet based upon the QoS level associated therewith. Then, and as indicated by the decision block 232, a determination is made as to whether an AM_ADDR address is available. If so, a new piconet with the same class is created, as indicated by the block 234. Otherwise, the no branch is taken to the block 236 and the allocation is considered to be a success.

If a determination is made at the decision block 226 that the data is a SCO-type, a branch is taken to the decision block 238 whereat a determination is made as to the type of data, and its associated QoS level, is to be communicated. Here, three possibilities exist, three levels of high quality voice data. If a determination is made that a first high quality voice data is to be communicated, a branch is taken to the block 242 whereat a new piconet is created. If a determination is made, conversely, at the decision block 238 that a second high quality voice data type is to be communicated, a branch is taken to the decision block 244.

At the decision block 244, a determination is made as to whether the piconet already assigned for second level high quality voice service has more than two mobile stations associated therewith. If so, a new piconet is required to be defined, and the yes branch is taken to the block 244 whereat a new piconet is defined. If not, the no branch is taken to the block 249 and the additional mobile station is defined to form a portion of the existing piconet associated with the communication service.

If a determination is made at the block 238 that a third level high quality voice service is to be effectuated, a branch is taken to the block 252 whereat a determination is made whether a piconet already-defined for such communication service has more than three mobile stations forming a portion thereof. If so, the yes branch is taken to the block 254 and a new piconet is created. Otherwise, a no branch is taken to the block 256 and a mobile station is assigned to form a portion of the existing piconet.

In another implementation of an embodiment of the present invention, heterogenous traffic per piconet is provided. Mixed QoS-level traffic is accommodated in a piconet. Low QoS-level traffic is presumed primarily to be ACL packet traffic and high QoS-level traffic is presumed to be SCO data, such as voice and real time traffic. Lower QoS-level traffic can enter the piconet associated with higher QoS-level traffic. If the higher QoS-level traffic enters the lower QoS-level piconet, the piconet would otherwise have to increase its QoS level. Consequently, the QoS level associated with a piconet is predicated upon the highest QoS-level traffic which is now accommodated in a current piconet. Therefore, the piconet QoS level is variable and the accommodating heterogeneous traffic in the piconet is able to improve its channel efficiency and throughput.

Figure 12B:
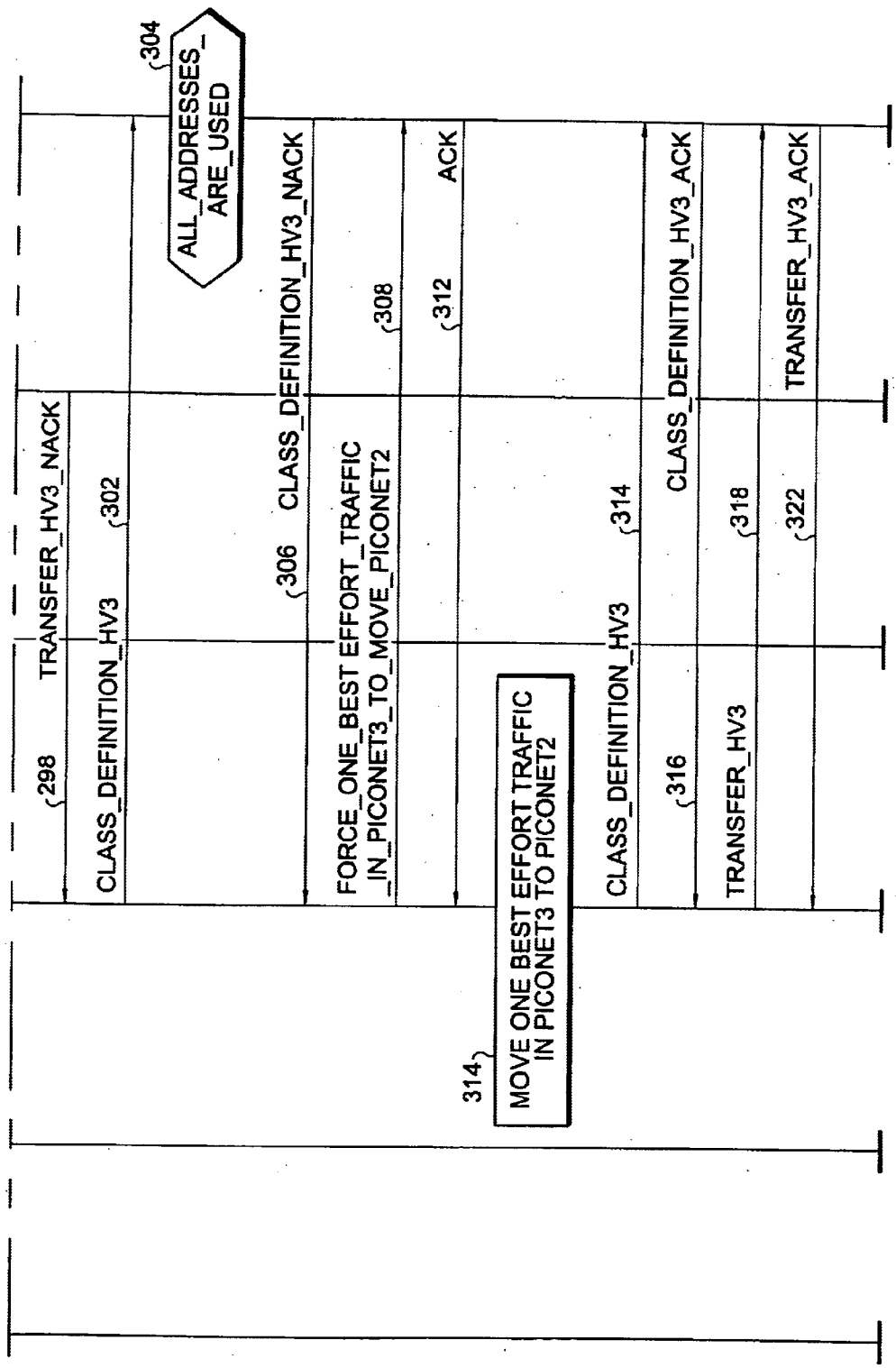
FIG. 12 illustrates a message sequence diagram listing the messaging generated during operation of an embodiment of the present invention.

FIG. 12 illustrates a message sequence diagram, shown generally at 262, which illustrates the signaling generated in an embodiment of the present invention in which piconets are defined for only a single type of QoS level communications, for example. Data is communicated to the access point, indicated by the segment 264 from which class information is derived therefrom. The type of communications to be effectuated with the mobile station is derived therefrom and passed on, indicated by the segment 266. And therefrom, the assignor establishes a piconet, indicated by the block 268. When additional data arrives from another mobile station, here a third level high quality voice data communication, indicated by the segment 272, a similar procedure commences, indicated by the segments 274. And, another piconet is established, indicated by the block 276.

Then, as indicated by the segment 282, a low QoS level communication is transmitted, indicated by the segment 282. Again, an analogous procedure is commenced, here indicated by the segments 284, and an additional piconet is established, indicated by the block 286. When a subsequent signal, here indicated by the segment 292 representative of another mobile station to communicate at third level high quality voice data, similar sequencing also commences, here indicated by the segments 294. Because a piconet is already established to handle such communications, the block 296 indicates that there are three mobile stations having high voice transmission. Therefore, piconet 2 cannot accept a new request.

Signaling is generated, indicated by the segments 298 and 302 responsive thereto. And, as indicated by the block 304, a determination is made here that no addresses are available in the piconet for the additional mobile station to form a portion thereof. Signaling indicated by the segments 306 and 308 are indicative thereof and the mobile station with best effort (low-level QoS) is caused to be moved to a piconet, here the piconet 3 at which address space is available. An acknowledgment is generated, indicated by the segment 312 and, as indicated by the block 314, the traffic associated with the lower QoS in the piconet 3 is moved to piconet 2 to free one address space. Additional signaling indicated by the segments 314, 316, 318, and 322 is generated responsive to such change.

Thereby, a manner is provided by which to increase the number of mobile stations which can communicate with a single access point in a Bluetooth-based communication system. Communications are not limited to a single piconet but, rather, a plurality of piconets are definable to permit additional mobile stations to communicate with the access point.

The previous descriptions are of preferred examples for implementing the invention, and the scope of the invention should not necessarily be limited by this description. The scope of the present invention is defined by the following claims.

We claim:

1. In a radio communication system in which a plurality of mobile stations communicate by way of radio links with a fixed site transceiver, an improvement of a scheduler for allocating communication channels upon which to permit communication between the fixed-site transceiver and selected ones of the plurality of mobile stations, said scheduler comprising:

a storage device coupled to the fixed-site transceiver, said storage device for storing indications of identities of the plurality of mobile stations together with quality of service (QoS) levels at which selected communications therewith are to be effectuated; and an assignor coupled to said storage device and capable of retrieving the indications stored thereat, said assignor selectably operable to define at least a first set of mobile stations of said plurality of mobile stations, the first set having a maximum number, or fewer, of mobile stations, and for assigning a communication channel upon which the selected communications between the mobile stations of the at least the first set and the fixed-site transceiver are to be effectuated.

2. The scheduler of claim 1 wherein the fixed-site transceiver and said plurality of mobile stations comprise Bluetooth-compatible devices and wherein at least the first set of mobile stations defines at least a first Bluetooth standard-defined piconet.

3. The scheduler of claim 2 wherein the maximum number of mobile stations defined by said assignor comprises seven mobile stations.

4. The scheduler of claim 1 wherein the mobile stations of the first set defined by said assignor have associated therewith a selected QoS level at which the selected communications therewith are to be effectuated.

5. The scheduler of claim 4 wherein the mobile stations of the first set defined by said assignor have associated therewith selected QoS levels at which the selected communications therewith are to be effectuated.

6. The scheduler of claim 5 wherein the selected QoS levels at which the selected communications are to be effectuated comprise at least a minimum quality threshold.

7. The scheduler of claim 6 wherein the selected QoS levels at which the selected communications are to be effectuated comprise a best effort level.

8. The scheduler of claim 7 wherein the selected QoS levels of the mobile stations of the first set defined by said assignor comprise the at least the minimum quality threshold for selected ones of the mobile stations and comprise the best effort level for other selected ones of the mobile stations.

9. The scheduler of claim 4 wherein said assignor further defines at least a second set of mobile stations, the second set also having the maximum number, or fewer, of mobile stations.

10. The scheduler of claim 1 wherein the QoS levels associated with the mobile stations, indications of which are stored at said storage device, selectably comprise a first QoS level and at least a second QoS level, wherein the at least first set of mobile stations defined by said assignor comprises the first set and at least a second set, and wherein said assignor maps mobile stations having the first QoS level associated therewith to the first set and mobile stations having the second QoS level associated therewith to the second set.

11. The scheduler of claim 10 wherein the mobiles stations of the first and at least second sets, respectively, are operable pursuant to a Bluetooth standard, and wherein the first QoS level associated with the first set is of a level greater than the second QoS level associated with the second set.

12. The scheduler of claim 11 wherein assignations are made by said assignor are dynamically made, the assignations responsive, at least in part, to QoS level at which the selected communications are to be effectuated.

13. The scheduler of claim 12 wherein the radio communication system communicates data packets, each data packet including a header portion and wherein indications of the QoS level are contained in the header portion of each of the data packets.

14. The scheduler of claim 1 wherein the at least the first set of mobile stations defined by said assignor comprises the first set and at least a second set, a first hopping pattern further defined at the first set and a second hopping pattern further defined at the second set.

15. The scheduler of claim 14 wherein the communications permitted between the fixed-site transceiver and the selected ones of the mobile stations comprise two-way communications upon a forward link and upon a reverse link and wherein, during a selected time period, communications effectuated between the mobile stations of the first set and the fixed-site transceiver are effectuated upon the forward link and communications effectuated between the mobile stations of the second set and the fixed-site transceiver are effectuated upon the reverse link.

16. The scheduler of claim 1 wherein at least one of the at least the first set of mobile stations defined by said assignor comprises the fixed-site transceiver as a portion thereof.

17. In a method for communicating in a radio communication system in which a plurality of mobile stations communicate by way of radio links with a fixed-site transceiver, an improvement of a method for allocating communication channels upon which to permit communications between the fixed-site transceiver and selected ones of the plurality of mobile stations, said method comprising:

storing indications of identities of a plurality of mobile stations together with QoS level at which selected communications therewith are to be effectuated;

defining at least a first set of mobile stations of the plurality of mobile stations, the first set having a maximum number, or fewer, of mobile stations; and assigning a communication channel upon which the selected communications between the mobile stations of the mobile stations of the at least the first set and fixed-site transceiver are to be effectuated.

18. The method of claim 17 wherein the fixed-site transceiver and the plurality of mobile stations comprise Bluetooth compatible devices and wherein the at least the first set of mobile stations defined during said operation of defining defines at least a first Bluetooth standard-defined piconet.

19. The method of claim 18 wherein at least one of the at least first Bluetooth standard-defined piconet comprises the fixed-site transceiver as a portion thereof.

20. The method of claim 18 wherein the maximum number of mobile stations forming the at least the first set of mobile stations defined during said operation of defining comprises seven mobile stations.

21. The method of claim 18 wherein the mobile stations of the first set defined during said operation of defining have associated therewith a common QoS level at which the selected communications are to be effectuated.

22. In a radio communication system in which a plurality of mobile stations communicate by way of radio links with a fixed site transceiver, an improvement of a scheduler for allocating communication channels upon which to permit communication between the fixed-site transceiver and selected ones of the plurality of mobile stations, said scheduler comprising:

a storage device coupled to the fixed-site transceiver, said storage device for storing indications of identities of the plurality of mobile stations together with quality levels at which selected communications therewith are to be effectuated;

an assignor coupled to said storage device and capable of retrieving the indications stored thereat, said assignor selectably operable to define at least a first set and a second set of mobile stations of said plurality of mobile stations, a first hopping pattern further defined at the first set, and a second hopping pattern further defined at the second set, the first set having a maximum number, or fewer, of mobile stations, wherein each of the at least first set defined by said assignor further has a master device defined thereat, the master device having a value associated therewith, and the hopping pattern defined thereat determined by the value associated with the master device; and wherein the assignor is further for assigning a communication channel upon which communications between the mobile stations of the at least the first set and the fixed-site transceiver are to be effectuated.

23. The scheduler of claim 22 wherein a first master device defined at the first set further comprises a first clock and wherein the second master device defined at the second set further comprises a second clock, the first clock and the second clock maintained in time synchronization.

24. The scheduler of claim 23 wherein the time synchronization between the first clock and the second clock includes a clock offset.

25. The scheduler of claim 24 wherein the clock offset between the first clock and the second clock is formed of a summation of a first clock offset portion and a second clock offset portion.

* * * * *